Patented May 3, 1949

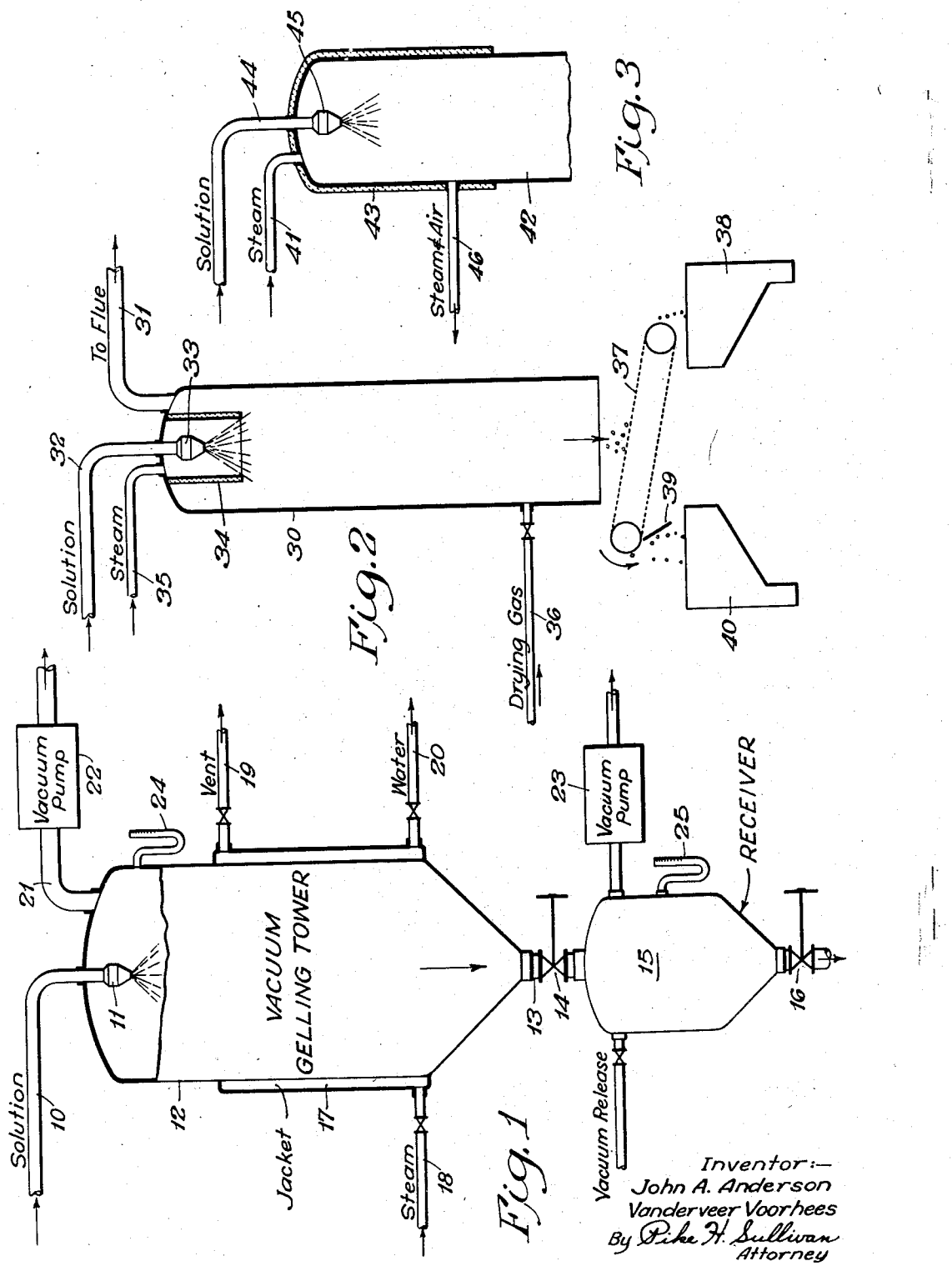

2,468,857

UNITED STATES PATENT OFFICE 2,468,857

PROCESS OF MAKING SPHEROIDAL GEL PARTICLES

John A. Anderson, Chicago, and Vanderveer Voorhees, Homewood, Ill., assignors to Standard Oil Company, Chicago, Ill., a corporation of Indiana Application November 29, 1945, Serial No. 631,769

6 Claims. (Cl. 252—448)

This invention relates to the manufacture of solids in the form of microspherical particles and it relates particularly to the manufacture of microspheroidal gel particles useful as catalysts and adsorptive agents. It has heretofore been found that for many purposes where finely divided solids must be subjected to considerable handling as in adsorption systems, in water treating and in the treatment of oils, particularly petroleum oils either in liquid or vapor phase where the vapors are contacted with moving masses of solids the destruction of the particles of solids or catalysts by attrition and the wear of the equipment by abrasion is greatly reduced by the use of said solids in the form of smooth rounded particles which may be spheres or spheroids. The problem occurs particularly in the decolorizing of oils, cracking of petroleum, hydroforming of naphtha, polymerization of gases and in hydrocarbon conversion processes generally. The movement of solids in these systems may be in a mass or moving bed or in dense or dilute phase suspension.

Various methods have been proposed and employed heretofore for the manufacture of spheroidal particles and it has been found that the metal oxide gels such as silica gel, alumina gel, magnesia-silica gel, chromium oxide gel, and various combinations of metal oxides in the form of their gels can be prepared in unusually strong particles by coagulating droplets of the respective sols or other solutions and thereafter drying and igniting, sometimes employing a washing step to remove undesirable water-soluble salts. In the preparation of the droplets of sol for making spheroidal gel particles, several methods have been devised including injecting droplets of the sol into a bath of an immiscible or partly miscible liquid, or spraying the sol with a suitable nozzle and allowing the particles to congeal or gel while suspended in a gaseous medium.

The latter method, wherein the metal oxide sol or other suitable solution producing the gel is sprayed into a gaseous atmosphere such as air, is best adapted to the formation of microspherical particles rather than larger gel particles. The microspherical particles referred to herein are particles having a diameter in the range of about 20 to 300 microns when gelled and dried, although considerably smaller particles can be prepared by this method when desired, i. e. particles having diameters of the order of two to ten microns. For most purposes, particularly for the conversion of hydrocarbons by contacting fluidized masses of catalyst particles, it is preferred to employ particles having diameters above 20 microns, preferably above 40 to 50 microns, in order to facilitate the recovery of the catalyst from suspension in the vapors and gases by reason of the increased settling rate of the larger particles. For example in catalytic cracking with fluidized solids it is necessary to remove carbonaceous deposits from the catalyst at frequent intervals which can be done by transferring it to a regenerating zone where it is contacted with air, for example at 1000 to 1200° F., requiring the catalyst to be recovered from the spent regeneration gas before discarding it to the flue. Where catalyst particles of more than 20 microns diameter are employed, the catalyst can be recovered from the flue gas by the simple use of cyclone separators, thus avoiding the need for expensive electric precipitators, bag filters, etc.

In the fluid catalyst conversion process referred to, the catalyst is maintained in a high state of turbulence in dense phase suspension by the upflowing streams of gases and vapors, thus subjecting it to considerable attrition. The density of the suspension may be about 10 to 35 pounds per cubic foot. The transfer of catalyst in high-velocity streams from one part of the apparatus to another also serves to break down the catalyst particles and reduce them to a point where it is difficult to longer recover the particles and they are quickly lost from the system. The loss of catalyst from the hydrocarbon conversion system which normally recycles 2 to 5 tons of catalyst per ton of oil treated and may recycle as much as 20 or 25 tons of catalyst per ton of oil treated, forms a major part of the cost of operating such processes and may be as much as 1 to 5 pounds per barrel of oil treated. It is therefore very important to employ catalyst in the form of particles having high physical strength and resistance to abrasion and crushing. The use of catalyst in the form of spheroidal gel particles has proved very advantageous for this reason.

In the preparation of microspheroidal gels by the spray technique, in which a solution is dispersed in a gaseous medium, we have discovered that a large portion of the particles are imperfect in that they contain bubbles of gas which greatly weaken the particles, reducing their average density and rendering them subject to easy fracture by crushing. The gas bubbles in the microspherical particles are not readily observed by the naked eye but can be detected easily by microscopic examination. The object of our invention is to prepare microspheroidal particles of gel which are solid throughout by employing a modification of the spray technique wherein a gel-producing solution of sol is sprayed into an atmosphere of vapor or gas. According to our invention, we surround the spray at the point of particle formation with a condensable vapor, that is, we substantially exclude noncondensable gases from the region where the sol particles are produced.

Our invention is illustrated by a drawing in which Figure 1 shows diagrammatically one form of apparatus for producing solid gel particles by spraying a solution into a chamber substantially free from noncondensable gases. Figure 2 shows another form of apparatus in which only the atmosphere immediately adjacent the spray nozzle is maintained free from noncondensable gases. Figure 3 is a modified form of the apparatus shown in Figure 2.

Referring to Figure 1, a suitable solution for the preparation of gels is introduced by line 10 to spray nozzle 11. This nozzle may be of the mixing type similar to that shown in U. S. patent of Marisic, 2,384,946, or if the solution used be a sol ready to gel without further mixing, the nozzle may be of the liquid ejector type in which a fine stream is ejected at high velocity from a vortex. We may employ a fast rotating disk onto which the sol is allowed to flow in a stream and thrown off the periphery at high velocity. If an aspirator type spray is used, it is necessary to employ a condensable vapor as the aspirating fluid therein.

The solution supplied by line 10 may be any suitable gel such as silicic acid sol, alumina sol, etc., or two solutions may be supplied to the mixer spray head 11 wherein the solutions are mixed and ejected in the form of a sol which quickly sets to a gel. Thus, a solution of sodium silicate and acid or sodium silicate and aluminum sulfate may be mixed for this purpose. The sol or other mixture of solutions is referred to herein as a "gelable solution," i. e. one which will gel of itself.

The spray nozzle 11 is located within chamber 12 which is of sufficient diameter to prevent the impingement of sprayed particles on the walls and of sufficient height to allow the particles of sol or other solution to become solidified before striking the bottom. It is preferred that chamber 12 be a tower of sufficient height to keep the particles in suspension until they have largely dried and become free flowing so that they can be easily removed at outlet 13 through valve 14 leading into vestibule 15 communicating with outlet valve 16 in order that the particles may be withdrawn without permitting access of the external atmosphere to the interior of chamber 12. Heat for drying the particles can be supplied by a heating jacket 17 surrounding chamber 12 and supplied by steam through line 18. Line 19 is a vent to the steam jacket and line 20 is a condensate discharge. When drying the gel within the tower it is preferred to supply heat at a lower section, allowing sufficient space above the heated section for the particles of gel to form from the solution injected at the top. Instead of drying the gel particles to a free-flowing mass, they may be partly dried and collected in an oil bath at the bottom of tower 12, the resulting slurry being removed from time to time or continuously through a suitable valve arrangement.

The atmosphere within chamber 12 is maintained substantially free from uncondensable gases by exhausting through line 21 to vacuum pump 22. The reduced pressure in chamber 12 may be maintained as low as 50 to 100 mm. mercury absolute when operating at normal temperatures but by operating at somewhat elevated temperatures the degree of vacuum need not be very high. Thus, when operating at a temperature of about 150° F. the absolute pressure may be of the order of 3.5 p. s. i. within chamber 12 and when operating at about 175° F. the pressure within chamber 12 may be about 7 pounds per square inch absolute, that is, about one-half atmosphere. The pressure employed will generally be somewhat below that which corresponds to the vapor pressure of water at the temperature of the tower.

When discharging the catalyst from chamber 12 through vestibule 15, valve 14 may be opened to admit into vestibule 15 a quantity of catalyst which will ordinarily be free flowing, somewhat like sea sand in its general appearance. Valve 14 is then closed and valve 16 opened to discharge the catalyst from the apparatus. Vacuum pump 23 is employed to exhaust vestibule 15 and it is usually desirable to maintain the pressure in 15 below that of chamber 12 at the time the solids are being transferred from chamber 12, in order to avoid any possibility of noncondensable gas gaining access to chamber 12 where it will interfere with the formation of the uniformly solid particles of gel. Manometers 24 and 25 serve to indicate the pressures existing in chambers 12 and 15 respectively.

It is ordinarily not serious if the particles contain small enclosures of uncondensable gas, which will result if the composition of the atmosphere within chamber 12 includes some uncondensable gas. Thus, a very small enclosure of fixed gas within the catalyst gel particles may result by operating with an atmosphere consisting of about 5 to 10 per cent air and 90 per cent water vapor by volume.

Although operation with the apparatus shown in Figure 1 is preferably conducted at pressures below atmospheric, this is not essential and we may operate at higher pressures, e. g. 10-100 p. s. i. with good results. In this case, the particles produced are usually in the hydrogel form. No vacuum pump is needed when using pressure above atmospheric but instead a supply of steam or other condensable vapor is required to fill the gelling chamber.

In order to avoid admission of uncondensable gases in solution in the sol or other solution supplied through line 10, we may previously exhaust this solution by boiling or by subjecting it to a vacuum sufficient to pull off dissolved gases.

In the apparatus shown in Figure 2, a closed system is not required but the spray tower 30 is open to the atmosphere at the bottom and may be connected by line 31 to a suitable exhaust means, for example to a flue. Atmospheric pressure is employed. As in the case of chamber 12, tower 30 is of sufficient diameter to avoid impingement of spray on the walls thereof. In the drawing it is indicated as of cylindrical form but it may also be of any other suitable shape; for example it may be a large rectangular room or chamber, preferably of sufficient height to permit drying the particles of gel before reaching the bottom. Tower 30 may also be heated by various means such as a heating jacket if desired.

The sol or solution is supplied by line 32 leading to nozzle 33 where the solution is dispersed in the upper part of the tower. Surrounding the nozzle we may employ a baffle or collar 34 into which a current of steam or other condensable vapor is led by line 35. In place of steam we may use alcohol vapor, methanol vapor, naphtha vapor, ethyl ether vapor, or the vapor of any suitable low boiling solvent which will condense under the conditions existing in a spray tower before the droplets of sol or other solution become solidified to a gel. The collar 34 is for the purpose of retaining the vapor around the nozzle and thus preventing contamination of the dispersed particles of solution by contact with fixed gases, for example air.

Drying of the sprayed particles is effected by contact with air or other drying gas which is introduced by line 36. Where the drying agent is air it is only necessary to allow free access of air, for example warmed air, to the base of tower 30 which may be open to the atmosphere. The solidified and preferably dried gel particles fall through the tower and alight on the upper surface of belt conveyor 37 which is travelling upwardly in the direction of the arrow. Perfect or nearly perfect spherical particles roll freely downward against the motion of the conveyor and are caught in receiver 38, while irregular particles and particles which are improperly dried and which adhere to the conveyor are removed by scraper 39 and fall into receiver 40. By proper adjustment of the conditions and the spray, the formation of imperfect particles is largely avoided.

Figure 3 illustrates an alternative arrangement of the upper part of tower 30. In this modification, hood or collar 34 is dispensed with and steam is supplied directly by line 41 to the top of tower 42 which is preferably insulated by lagging 43. A suitable solution of sol is injected by line 44 to nozzle 45 and the spray is formed in an atmosphere consisting substantially entirely of steam or other condensable vapor. The steam escapes from the tower by line 46 which may lead to an exhaust vent or flue. Air or other drying gas supplied to the tower is discharged therefrom along with the excess steam used to blanket the top of the tower. It is desirable that the specific gravity of the steam or other vapor in the top of the tower be less than that of the drying gas in the lower part of the tower in order to avoid undesirable mixing or "inversion" of the vapors and gases.

In the apparatus described in Figures 2 and 3, a drying gas flowing upwardly through towers 30 or 42 which may be previously freed of moisture in order to accelerate its drying effect, may also or alternatively be heated to a somewhat elevated temperature, e. g. 150 to 250° F. or higher, care being taken to avoid heating the gel particles to a temperature at which they are damaged by excessive rate of evaporation of moisture therefrom. Since the particles prepared by our process are solid throughout, they can be subjected to more rapid heating without rupture than is the case with solids containing trapped uncondensable gases which expand and rupture the particles on heating or which act as nuclei for the liberation of steam.

The heated vapors supplied by lines 35 and 41 have the effect of hastening the gelling of the sprayed particles of solution or sol. Where steam is employed it serves to prevent drying of the particles of sol before gelation has occurred, thus avoiding the formation of a skin or envelope of gel around each particle which is later subject to wrinkling and distortion by irregular shrinking of the gel on drying. The use of an atmosphere of steam in the region of particle formation, therefore, serves not only to prevent the occlusion of fixed gases within the particles but also provides a means for controlling the rate of drying during the gelling of the particles.

When employing silica sol free of alkali metal salts or mixtures of such silica sol and alumina sol, we can prepare a microspherical catalyst ready for use in hydrocarbon conversion without washing. The dried gel from the gelling chamber passes directly to an ignition step where it is heated to about 1000–1200° F. for several hours, then cooled and charged to the conversion process.

The term "condensable vapors" used in this application includes vapors having boiling points above the temperature under consideration and also water-soluble gas which dissolves in the hydrogel at the conditions of gelling. The term includes any vapor or gas which reverts to the liquid phase at the gelling conditions.

Having thus described our invention what we claim is:

1. The process of making solid spheroidal particles of an inorganic oxide gel which comprises spraying an inorganic oxide sol, capable of gelling, into an atmosphere of condensable vapor substantially free of noncondensable gases, forming said sol into spheroidal droplets within said atmosphere and, while said droplets are still liquid, condensing vapors included therewithin, maintaining said droplets in suspension for a period of time sufficient to permit gelling and thereafter drying the resulting gel particles.

2. The process of claim 1 wherein said atmosphere consists substantially entirely of steam.

3. In the process of preparing microspheroidal particles of an inorganic oxide gel substantially free from gas inclusions normally obtained when a gelable inorganic oxide sol is sprayed into an atmosphere of gas and allowed to gel therein, the improvement comprising spraying said gelable aqueous solution in the form of spheroidal droplets into an evacuated zone from which air and other fixed gases are substantially excluded, removing water vapor from said evacuated zone, maintaining the droplets of solution dispersed within said zone for a sufficient period of time to permit condensation of vapor included within said droplets followed by complete gelation and solidification thereof and thereafter drying the gel particles.

4. The process of claim 3 wherein said gelable solution is a silicic acid sol.

5. The process of preparing an inorganic oxide gel in the form of small solid spheroidal particles substantially free from gas inclusions which comprises dispersing a gelable inorganic oxide sol in the form of small spheroidal droplets in the upper part of a gelling zone, maintaining in the top of said gelling zone a vapor susbtantially entirely condensable at the conditions of temperatures and pressure existing within said droplets at the time of gelling, maintaining in the lower part of said gelling zone an atmosphere of a drying gas for removing water from descending gel particles, said drying gas being prevented by said vapor from contacting said droplets of solution during their formation, and effecting condensation of condensable vapor occluded within said droplets before solidification and removal of water therefrom.

6. The process of claim 5 wherein said vapor is caused to flow downwardly from the top of said gelling zone concurrently with said particles and said drying gas is caused to flow upwardly from the bottom of said gelling zone countercurrently to said particles, said vapor and said gas being withdrawn from said zone at an intermediate point between top and bottom thereof.

JOHN A. ANDERSON.
VANDERVEER VOORHEES.

REFERENCES CITED

The following references are of record in the file of this patent:

UNITED STATES PATENTS

| Number | Name | Date |
|---|---|---|
| 1,501,876 | Wreesman | July 15, 1924 |
| 1,506,118 | Govers | Aug. 26, 1924 |
| 1,755,496 | Behrman | Apr. 22, 1930 |
| 1,843,576 | McClure | Feb. 2, 1932 |
| 2,137,213 | Clayton et al. | Nov. 15, 1938 |
| 2,295,595 | Mills | Sept. 15, 1942 |
| 2,316,670 | Colgate et al. | Apr. 13, 1943 |
| 2,384,946 | Marisic | Sept. 18, 1945 |
| 2,413,420 | Stephanoff | Dec. 31, 1946 |
| 2,435,379 | Archibald | Feb. 3, 1948 |

Certificate of Correction

May 3, 1949.

Patent No. 2,468,857.

JOHN A. ANDERSON ET AL.

It is hereby certified that errors appear in the printed specification of the above numbered patent requiring correction as follows:

Column 3, line 27, after the word "may" insert *also*; line 34, for "gel" read *sol*; column 6, line 48, claim 3, after "the" insert *resulting*; and that the said Letters Patent should be read with these corrections therein that the same may conform to the record of the case in the Patent Office.

Signed and sealed this 11th day of October, A. D. 1949.

[SEAL]

THOMAS F. MURPHY,
*Assistant Commissioner of Patents.*